United States Patent [19]

Gallo

[11] 4,281,474
[45] Aug. 4, 1981

[54] FRESH FLOWER HOLDER

[76] Inventor: Joseph S. Gallo, 58 Peach St., Walpole, Mass. 02081

[21] Appl. No.: 202,194

[22] Filed: Oct. 30, 1980

[51] Int. Cl.$^3$ .............................................. A01G 5/00
[52] U.S. Cl. ......................................... 47/58; 47/55; 428/24
[58] Field of Search .................... 47/41, 41 SS, 41.11, 47/41.12, 41.13, 55, 58; D11/146, 164; 24/5; 428/23–26

[56] References Cited

U.S. PATENT DOCUMENTS

| | | | |
|---|---|---|---|
| 2,593,797 | 4/1952 | Robbins | 47/55 |
| 3,150,462 | 9/1964 | Gallo | 47/55 |
| 3,318,044 | 5/1967 | Kise | 47/55 |
| 3,553,889 | 1/1971 | Gallo | 47/55 |

Primary Examiner—James R. Feyrer

[57] ABSTRACT

A holder for a fresh flower or bud from which the stem has been severed, the holder including a covered wire, a portion of absorbent material formed around an intermediate portion of the covered wire to form a moisture reservoir, and a water-repellent covering formed around the absorbent material and extending down the length of the stem, the improvement wherein the strip of absorbent material is formed around the wire in a generally conical formation to form at the flower end a generally conical well for receiving the severed end of the flower and to form at the other end a tapered transition between the moisture reservoir and the wire, whereby when the holder is moistened and the flower is impaled on the end of the wire the severed end of the flower is securely held within the well formed by the absorbent material.

10 Claims, 4 Drawing Figures

FRESH FLOWER HOLDER

FIELD OF THE INVENTION

This invention relates to holders for fresh flowers.

BACKGROUND OF THE INVENTION

Corsages are often made by impaling the severed end of a fresh flower with a wire holder. To keep the flower fresh for an extended period, it is known to add a moisture reservoir to the holder. My U.S. Pat. No. 3,150,462 (hereby incorporated by reference) describes a holder with such a moisture reservoir; cotton is wrapped around a flocked-wire stem and covered by an outer coating of water-repellent adhesive tape.

Artificial stems for flowers used in floral arrangements have been made by doubling and twisting a length of wire which has been wound with a textile covering (such as described in my U.S. Pat. No. 3,553,889, hereby incorporated by reference).

SUMMARY OF THE INVENTION

I have found a method of greatly improving the performance of the fresh flower holder of my U.S. Pat. No. 3,150,462. The invention features forming the absorbent material in a generally conical formation around the wire, to thereby form a generally conical well for receiving the severed end of the flower.

With the invention the flower is held more firmly in place because the conical well hugs the sides of the flower stem; moisture transfer from the absorbent material to the flower is not interrupted by slight movement of the flower away from the moisture reservoir because contact is maintained between the sides of the conical well and the flower stem; there is a better appearance to the holder in that the conical formation provides a tapered transition at the end opposite the flower, and this more precisely replicates the appearance of the displaced stem; and the absorbent material can be better concealed within the water-repellent wrap because of the generally conical shape.

In preferred embodiments, a length of wire wound with a textile covering is bent double at the flower end of the holder, to thereby prevent the water-soaked covering from backing off the wire during insertion into the flower; the bent-double portion of the covered wire extends into but not beyond the moisture reservoir; the absorbent material is a strip wrapped at a nonperpendicular angle around the wire to achieve the conical configuration; two or more steps are formed in the well by the wrapping, the steps helping to support and grip the flower and to maintain moisture-supplying contact with the flower even after a slight outward movement thereof; and an adhesive tape wound the full length of the holder forms the water repellent covering.

PREFERRED EMBODIMENT

The structure and use of a preferred embodiment of my invention will now be described, after first briefly describing the drawings.

Figure 4:
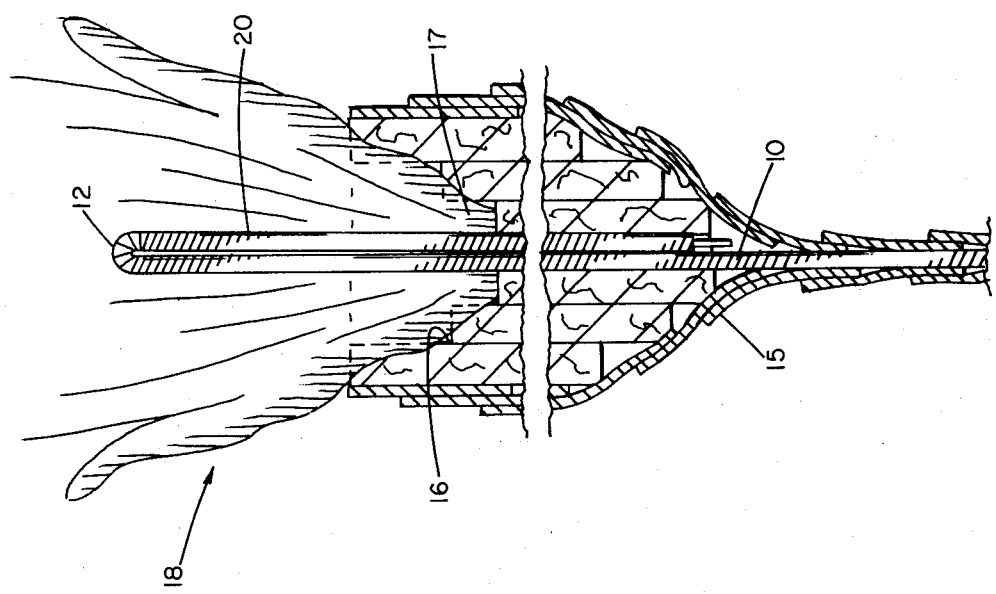
FIG. 4 is an enlarged sectional view of the upper portion of the holder with the base of a flower in place.
Figure 3:
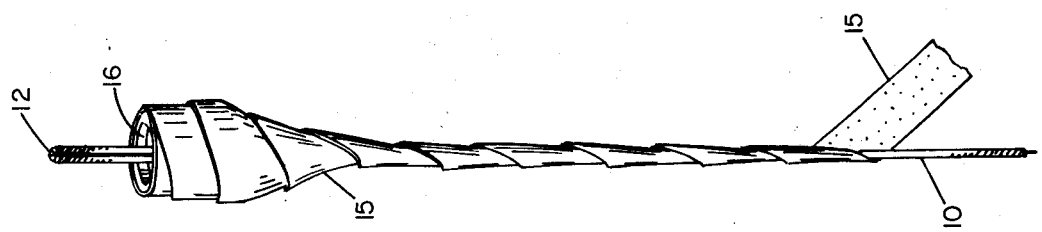
FIG. 3 is a perspective view of the holder with the outer water-repellent wrapping added.
Figure 2:
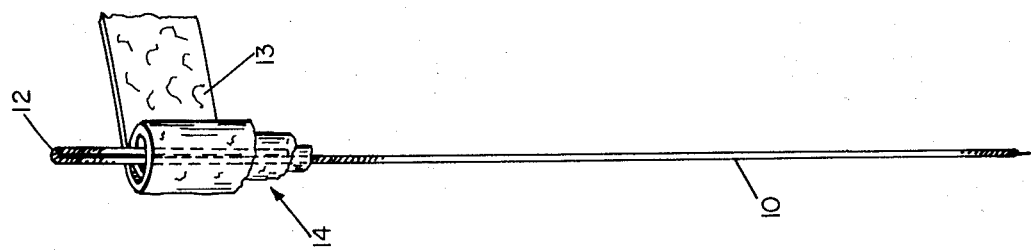
FIG. 2 is a perspective view illustrating a further step in the manufacture in which a strip of absorbent cotton is wound about the bent wire.
Figure 1:
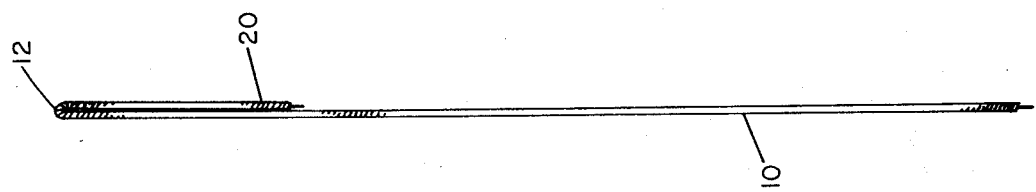
FIG. 1 is a perspective view illustrating the first step in the manufacture of the flower holder in which a stiff wire of small gauge, which has been wound about with a textile covering, is bent double.

The flower or bud holder illustrated in the drawings includes a length of stiff millinary wire 10 (i.e., wire wound with a textile covering) partially bent double as shown at 12, a strip 13 of absorbent cotton wound in a generally conical formation 14 around the wire as shown in FIG. 2 forming a reservoir for supplying the flower with water, and providing support for the base and sides of the lower extremity of the flower or bud, and a water-repellent tape 15 wound around the cotton cone and down the length of the stem 10 to form a watertight cover for the cone-shaped reservoir and to bind together the several elements of the holder. As shown in FIG. 4 the flower is impaled on the bent end 12 of the millinary wire and its severed end 17 is seated securely inside the generally conical well 16 at the upper end of the holder. Bent over portion 20 of wire 10 extends into but not beyond the moisture reservoir, thereby leaving only a single thickness of wire. A single wire thickness is preferred because it is more easily bent when attaching the corsage. The moisture reservoir has a tapered transition surface 19 at the end opposite the flower. The taper tends to better replicate the appearance of the severed flower stem. Well 16 and tapered transition 19 both have a stepped shape, as shown in FIG. 4, due to the nonperpendicular wrapping of strip 13 about wire 16 (as shown in FIG. 2). Well 16 has two steps (shown in dashed lines in their form before insertion of the flower). The steps help support and grip the severed end of the flower. They also tend to maintain moisture-supplying contact with the flower even if the flower works its way outward slightly from the bottom of well 16.

Prior to use the holder is immersed in water so that the cotton strip 13 is saturated. In order to impale the flower 18 inside well 16 and upon bent end 12 of the millinary wire, the holder is grasped firmly at a point immediately below the base of the cotton wrapping configuration and the bent end 12 is forced into the severed end 17 of a flower or bud and up in the flower or bud until the severed end comes to rest fully within well 16.

Other embodiments of the invention are within the following claims.

What is claimed is:

1. In the method of making a holder for a fresh flower or bud from which the stem has been severed, said holder including a covered wire, a portion of absorbent material formed around an intermediate portion of the covered wire to form a moisture reservoir, and a water-repellent covering formed around said absorbent material and extending down the length of said stem, the improvement comprising the steps of bending double at one end a length of textile-covered wire, forming a moisture reservoir spaced from the bent double end of said wire by winding around said covered wire a strip of absorbent material while said material is oriented in a nonperpendicular orientation with respect to said wire, so as to thereby form a generally conical well having a stepped interior surface at the flower end of said reservoir and to thereby form a tapered transition having a stepped exterior surface at the other end of said reservoir, and wrapping an adhesive, water-repellent tape around said absorbent material and wire, so that said tape extends to the edge of or just beyond said absorbent material at the flower end and continues beyond said tapered transition down the length of said wire, whereby, when said holder is moistened and said flower is impaled on the bent-over end of the wire, the textile-covered wire enters the severed end of said flower without the textile material working off the wire, and the severed end of said flower is securely held within the well formed by the absorbent material.

2. In a holder for a fresh flower or bud from which the stem has been severed, said holder including a covered wire, a portion of absorbent material formed around an intermediate portion of the covered wire to form a moisture reservoir, and a water-repellent covering formed around said absorbent material and extending down the length of said stem, the improvement wherein said strip of absorbent material is formed around said wire in a generally conical formation to form at the flower end a generally conical well for receiving the severed end of said flower and to form at the other end a tapered transition between the moisture reservoir and the wire, and wherein said absorbent material is a strip wound around said covered wire while said material is oriented in a nonperpendicular orientation with respect to said wire, thereby forming said absorbent material so that said generally conical well is a stepped interior surface and said tapered transition is a stepped exterior surface.

3. The holder of claim 1 wherein said covered wire comprises a wire about which is wound a textile covering, and said textile-wound wire is bent over at the end on which the flower is to be impaled.

4. The holder of claim 3 wherein the length of the doubled over portion of said textile-covered wire is less than the full length of said holder.

5. The holder of claim 4 wherein said doubled over portion extends only so far down said holder as to enter said moisture reservoir but not far enough to extend beyond said reservoir, thereby leaving a single wire for use in attaching the corsage.

6. The holder of claim 5 wherein said water repellent covering extends to the edge of or slightly beyond said absorbent material in the direction of said flower, whereby said absorbent material is concealed when said flower is impaled upon the holder.

7. The holder of claim 2 wherein said absorbent material is wound around said wire so as to form at least two steps along said well.

8. The holder of claim 7 wherein said covered wire comprises a wire about which is wound a textile covering, and said textile-wound wire is bent over at the end on which the flower is to be impaled.

9. The holder of claim 8 wherein said water-repellent covering comprises an adhesive tape wound around said absorbent material and wire.

10. The holder of claim 9 wherein said textile-covered wire extends in one piece the full length of said holder.

* * * * *